(12) United States Patent
Yoshino et al.

(10) Patent No.: US 6,655,724 B1
(45) Date of Patent: Dec. 2, 2003

(54) INERTIA LOCKING SYSTEM AND COLLAPSIBLE SEAT WITH THE LOCKING SYSTEM

(75) Inventors: Yoshihiko Yoshino, Tochigi-ken (JP); Yoshinobu Kaneko, Tochigi-ken (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 10/154,455

(22) Filed: May 23, 2002

(51) Int. Cl.$^7$ .............................. B60N 2/14; B60N 2/433
(52) U.S. Cl. .................. 296/65.09; 296/65.03; 296/68.1; 248/503.1; 297/216.1
(58) Field of Search ................. 296/65.03, 68.1, 296/65.09; 248/503.1; 297/216.1, 335

(56) References Cited

U.S. PATENT DOCUMENTS

| | | | |
|---|---|---|---|
| 2,864,432 A | * | 12/1958 | Limberg |
| 4,909,571 A | * | 3/1990 | Vidwans et al. |
| 4,988,134 A | * | 1/1991 | Vidwans et al. |

* cited by examiner

*Primary Examiner*—Stephen T. Gordon
*Assistant Examiner*—Gregory Blankenship
(74) *Attorney, Agent, or Firm*—Dann, Dorfman, Herrell and Skillman, P.C.

(57) ABSTRACT

An inertia locking system for a vehicle seat is disclosed. The seat has a C-shaped leg portion. The inertia locking system includes a pedestal mounted on the vehicle floor. The pedestal has an oblique, upwardly facing U-shaped receiving port for receiving the leg portion. A U-shaped clip having a second opening is provided for also receiving the leg portion. The second opening faces obliquely upward and has a width slightly narrower than the diameter of the lower section of the leg portion. A latch having an inverted J-shape has a lower base portion, a curved upper portion, and a jaw portion. The latch is pivotally supported at the lower base portion to a side portion of the pedestal and spring biased away from the receiving port. The curved upper portion faces the receiving port and the jaw portion protrudes beyond an inner surface of the receiving port.

2 Claims, 8 Drawing Sheets

INERTIA LOCKING SYSTEM AND COLLAPSIBLE SEAT WITH THE LOCKING SYSTEM

TECHNICAL FIELD

The present invention relates to an inertia locking system, in which a latch is biased by a torsion coil spring and adapted to be operated by an inertia force that is applied to the latch against an action of the torsion coil spring when a locked member is brought into contact with the latch member, whereby the latch catches and holds the locked member, and relates to an improvement of a collapsible seat provided with the inertia locking system.

BACKGROUND ART

In general, as a seat for a station wagon or the like, there is a seat as shown in FIG. 7. The station wagon has a vehicle body floor F which has a lower step portion $f_1$ and an upper step portion $f_2$. The seat comprises a seat cushion 1 having a substantially C-shaped leg portion 1a provided at a lower portion thereof which is close to a front side of the seat cushion 1, the C-shaped leg portion 1a being mounted to the seat cushion 1 with an opening of the leg portion 1a facing upwardly, and a seat back 2 pivotally supported to the upper step portion $f_2$ so as to be tillable. More particularly, the seat back 2 is provided with a bracket 2a which protrudes downwardly from a lower portion of the seat back 2, and the seat back 2 is pivotally supported to the upper step portion $f_2$ by causing the bracket 2a to be pivotally supported to the upper step portion $f_2$ by means of a supporting shaft 2b. The seat cushion 1 has a curved arm 1b extending rearward from a rear portion of the seat cushion 1. The seat cushion 1 pivotally supported to the seat back 2 by causing the curved arm 1b to be supported to a lower portion of a side of the seat back 2 by means of a supporting shaft 1c. The seat cushion 1 can be jump up or rotated around the supporting shaft 1c.

The leg portion 1a has a lower section 1a' and is adapted to be received at the lower section 1a' thereof in a receiving port of an inertia locking system 3 mounted on the lower step portion $f_1$ of the vehicle body floor F.

Referring now to FIG. 8, the conventional inertia locking system 3 will be discussed hereinafter in order to facilitate understanding of the present invention. The inertia locking system 3 comprises a pedestal 31 mounted on the lower step portion $f_1$ of the vehicle body floor F, the pedestal 31 having a substantially U-shaped receiving port 30 for receiving the lower section 1a' of the leg portion 1a, and a latch 32 formed into a substantially inverted J-shape for catching the lower section 1a' of the leg portion 1a. The receiving port 30 is open toward an obliquely upper direction and adapted to receive the lower section 1a' of the leg portion 1a. The latch 32 has a lower base portion 32a, a curved upper portion, and a curved surface between the lower base portion 32a and the upper portion 32b. The latch 32 is pivotally supported at the lower base portion 32a thereof to a side portion of the pedestal 31 by a pivot pin 33 with the curved upper portion 32b thereof facing the receiving port 30. The inertia locking system 3 further includes a torsion coil spring 34 biasing the latch 32 rearward away from the receiving port 30.

A coiled portion 34a of the torsion coil spring 34 is mounted on an axis of the pivot pin 33. One end 34b of the torsion coil spring 34 is fastened to a projection piece 35 which projects laterally from the side portion of the pedestal 31 at a position which is close to a rear side of the pivot pin 33. The other end of 34c of the torsion coil spring 34 is fastened to a projection piece 36 protruding laterally at a side portion of the latch 32 which is above the pivot pin 33.

In the inertia locking system, the latch is always biased rearward away from the receiving port 30 of the pedestal 31 by the torsion coil spring 34 in order to dissolve a troublesome operation which a passenger is forced to carry out when releasing the seat from a locked condition of the seat by the latch system 3. The seat is adapted to be engaged through the leg portion 1a thereof with the inertia locking system in a condition as shown in FIG. 8. That is, the seat is engaged with the inertia locking system in a state where the lower section 1a' of the leg portion 1a is received in the receiving port 30. In this condition, the lower section 1a' of the leg portion 1a is not gripped and held by the latch 32 yet. When car-collision or the like occurs, an inertia force will be applied to the latch 32 and the latch 32 is operated against an action of the torsion coil spring 34 by the inertia force in such a manner that a position of center of gravity which corresponds to a fastening point of the spring end 34c is moved to a front side. Thus, the lower section 1a' of the leg portion 1a which is received in the receiving port 30 of the pedestal 31 can be gripped and held by the latch 32.

However, in the seat which can be jumped up as described above, since an offset exists between a center of rotation about the supporting shaft 1c (FIG. 7) and the center of gravity of the seat cushion 1, a rotational force which tends to cause the seat cushion 1 to be jumped up is generated at a time when a sitting person does not exist due to the car-collision or the like. In the inertia locking system, since the latch 32 is operated after the inertia force is generated due to the collision or the like, considerable time is required until the latch 32 engages with the lower section 1a' of the leg portion 1a of the seat cushion 1, so that there is a possibility that the lower section 1a' of the leg portion 1a will not be gripped and held by the latch 32.

Further, since the latch 32 is always biased rearward away from the back of the receiving port 30 of the pedestal 31 by the torsion coil spring 34, if any foreign materials and the like adhere around an axis of the pivot pin 33, the passenger can not know in advance that the latch 32 is in a non-rotatable state due to the foreign materials and the like.

DISCLOSURE OF THE INVENTION

It is an object of this invention to provide an inertia locking system which can securely lock a vehicle seat relative to a body floor of a vehicle by a simple operation. It is another object of the present invention to provide a collapsible seat in which, when car-collision or the like accidentally occurs, a seat cushion can be securely prevented from being jumped.

In accordance with one aspect of the present invention, there is provided an inertia locking system for locking a vehicle seat relative to a body floor of a vehicle, which is adapted to be arranged on the body floor of the vehicle. The vehicle seat includes a seat back supported to the vehicle body floor and a seat cushion pivotally supported to the seat back. The seat cushion has a substantially C-shaped leg portion attached thereto with an opening thereof facing upwardly. The leg portion has a lower section. The inertia locking system comprises a pedestal adapted to be mounted on the body floor and having a substantially U-shaped receiving port, the receiving port having a first obliquely, upward facing opening for receiving the lower section of the leg portion, a substantially U-shaped clip having a second opening for receiving the lower section of said leg portion, the clip being received in the first opening of the receiving port and attached to the pedestal with the second opening thereof facing obliquely and upwardly, the second opening of the clip having a width slightly narrower than a diameter of an axis of the lower section of the leg portion, a latch formed into a substantially inverted J-shape, the latch having a lower base portion, a curved upper portion, and a jaw portion protruding from the lower base portion, the latch being pivotally supported at the lower base portion thereof to a side portion of the pedestal by a pivot pin with the upper portion thereof facing the receiving port and with the jaw portion protruding beyond an inner surface of the receiving port, and a torsion coil spring for always biasing the latch away rearward from the receiving port, the torsion coil spring having a coiled spring portion and first and second ends, the coiled spring portion being mounted on an axis of said pivot pin, the first end of the torsion coil spring being fastened to a position of the side portion of the pedestal which is close to a rear side of the pivot pin, the second end of the torsion coil spring being fastened to a side of the latch, wherein when the lower section of the leg portion is received in the first opening of the receiving port and the second opening of the clip, the lower section of the leg portion kicks the jaw portion so as to rotate the latch in the opposite direction to the direction in which the latch is always biased by the torsion spring, whereby the lower section of the leg portion is positively caught by the upper curved portion of the latch.

According to a further aspect of the present invention, there is provided a collapsible seat for a vehicle. The seat comprises a seat back supported to a body floor of a vehicle, a seat cushion pivotally supported to the seat back so as to be tillable, the seat back being provided with a substantially C-shaped leg portion, the leg portion being attached to the seat cushion with an opening thereof facing upwardly; the leg portion having a lower section, and an inertia locking system for locking the seat relative to the body floor. The inertia locking system comprises a pedestal mounted on the body floor and having a substantially U-shaped receiving port, the receiving port having a first obliquely, upward facing opening for receiving the lower section of the leg portion, a substantially U-shaped clip having a second opening for receiving the lower section of the leg portion, the clip being received in the first opening of the receiving port and attached to the pedestal with the second opening thereof facing obliquely and upwardly, the second opening of the clip having a width slightly narrower than a diameter of an axis of the lower section of the leg portion, a latch formed into a substantially inverted J-shape, the latch having a lower base portion, a curved upper portion, and a jaw portion protruding from the lower base portion; the latch being pivotally supported at the lower base portion thereof to a side portion of the pedestal by a pivot pin with the upper portion thereof facing the receiving port and with the jaw portion protruding beyond an inner surface of the receiving port, and a torsion coil spring for always biasing the latch away rearward from the receiving port, the torsion coil spring having a coiled spring portion and first and second ends, the coiled spring portion being mounted on an axis of the pivot pin, the first end of the torsion coil spring being fastened to a position of the side portion of the pedestal which is close to a rear side of the pivot pin, the second end of the torsion coil spring being fastened to a side of the latch, wherein when the lower section of the leg portion is received in the first opening of the receiving port and the second opening of the clip, the lower section of the leg portion kicks the jaw portion so as to rotate said latch in the opposite direction to the direction in which the latch is always biased by the torsion spring, whereby the lower section of the leg portion is positively caught by the upper curved portion of the latch.

The other features than the features mentioned above will be apparent in an embodiment in accordance with the present invention described below.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denotes the same parts throughout the Figures and wherein.

EMBODIMENT FOR CARRYING OUT THE INVENTION

Figure 1:
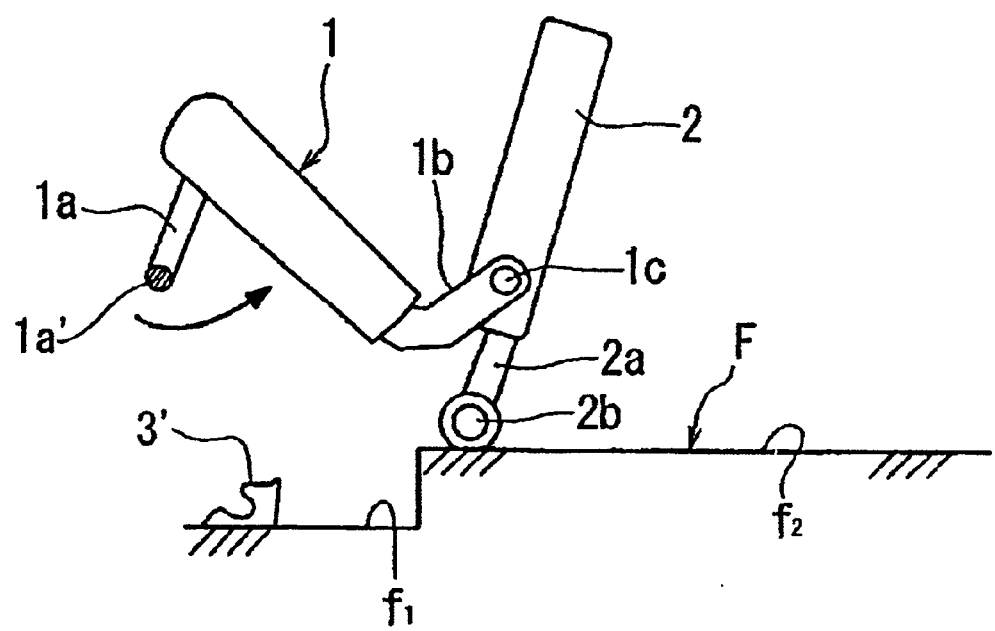
FIG. 1 is a schematic view showing a collapsible seat provided with an inertia locking system according to the present invention.

A description will be given below of an embodiment with reference to FIGS. 1 to 6. The illustrated embodiment is applied to a collapsible seat which comprises a seat cushion 1, a seat back, and an inertia locking system 3' mounted on a vehicle body floor F, in which the inertia locking system 3' is employed as locking means to prevent the seat cushion 1 from being accidentally jumped up. In the illustrated embodiment, the seat cushion 1 and the seat back 2 are constructed in the substantially same manner as the seat cushion and seat back of FIG. 7 are done. In FIGS. 1 to 6, parts which are similar to those shown in FIG. 7 are denoted by the same designators.

The seat cushion 1 has a substantially C-shaped leg 1a provided at a lower portion thereof which is close to a front side of the seat cushion 1. The C-shaped leg portion 1a is mounted to the seat cushion 1 with an opening of the leg portion 1a facing upwardly, and is adapted to be capable of standing relative to a lower step portion $f_1$ of the vehicle body floor F. The seat back 2 is pivotally supported to an upper step portion $f_2$ of the vehicle body floor F so as to be tillable. More particularly, the seat back 2 is provided with a bracket 2a which protrudes downwardly from a lower portion of the seat back 2, and the seat back 2 is pivotally supported to the upper step portion $f_2$ by causing the bracket 2a to be pivotally supported to the upper step portion $f_2$ by means of a supporting shaft 2b. The seat cushion 1 has a curved arm 1b extending rearward from a rear portion of the seat cushion 1. The seat cushion 1 is pivotally supported to the seat back 2 by causing the curved arm 1b to be supported to a lower portion of a side of the seat back 2 by means of a supporting shaft 1c. The seat cushion 1 can be jumped up or rotated around the supporting shaft 1c.

The leg portion 1a of the seat cushion 1 is formed into a substantially C-shape in outline by bending a metal round pipe into a substantially C-shape and is pivotally supported to the seat cushion 1 with both axial ends of the leg portion 1a being connected to both sides of the lower portion of the seat cushion 1 by a supporting shaft (not shown). In the illustrated example, the curved arm 1b is formed into a substantially inverted L-shape and obliquely curved at an angle substantially corresponding to an angle of incline of the seat back 2.

Figure 2:
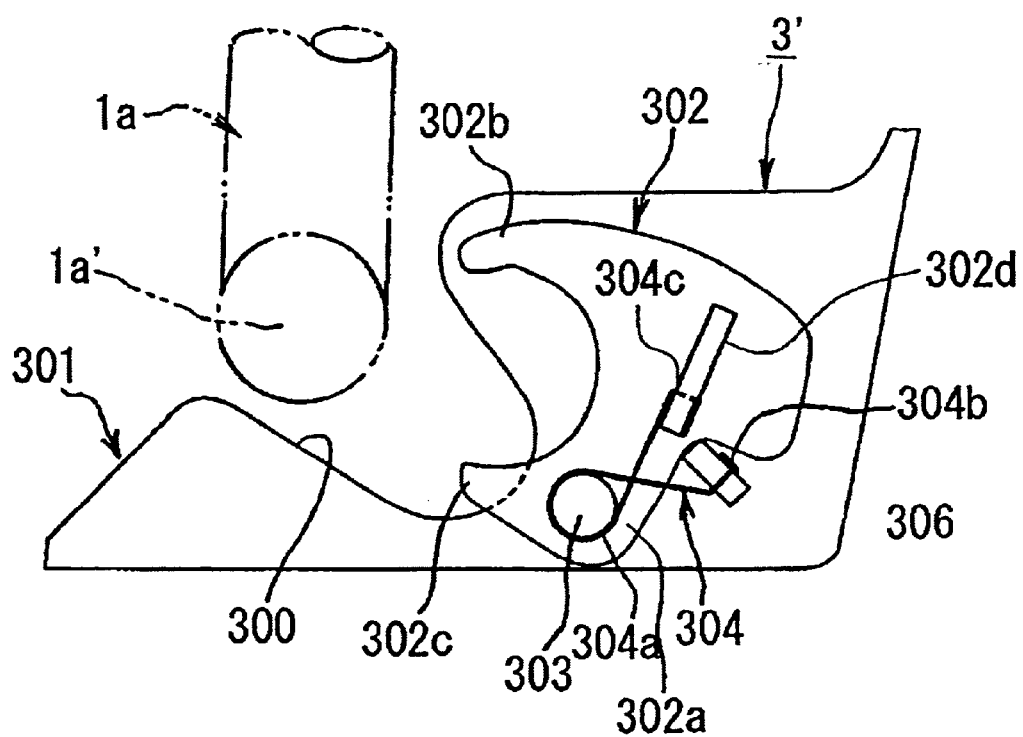
FIG. 2 is a schematic view showing the inertia locking system, in which a clip is removed for clarity of illustration.
Figure 3:
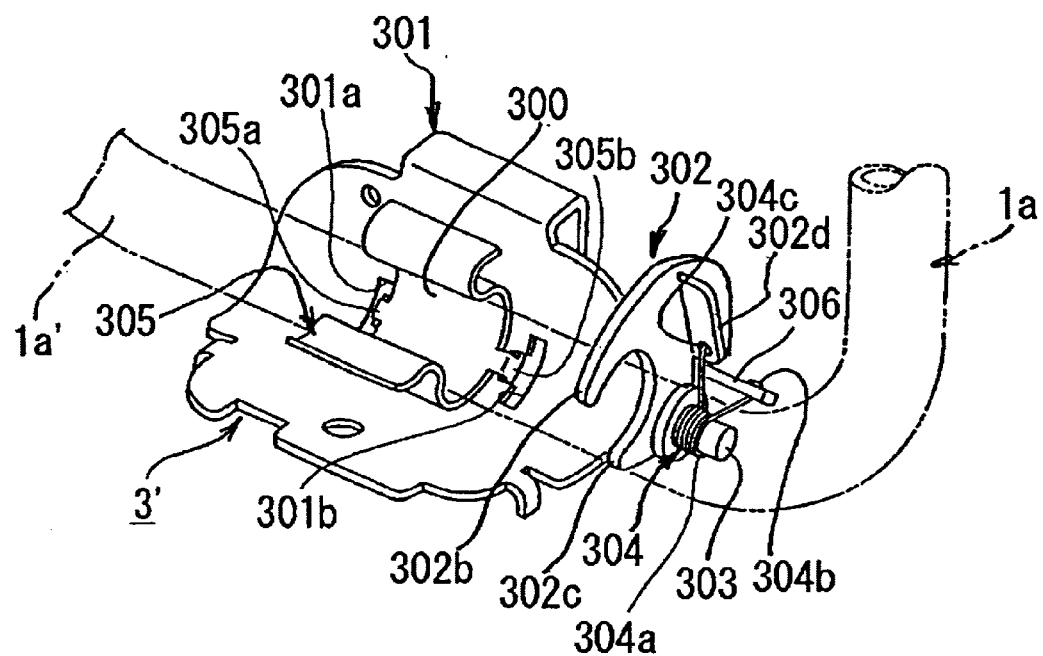
FIG. 3 is a schematic perspective view showing the inertia locking system of FIG. 2.

As shown in FIGS. 2 and 3, the inertia locking system 3' comprises a pedestal 301 mounted on the lower step portion $f_1$ of the vehicle body floor F (FIG. 1), the pedestal 301 having a substantially U-shaped receiving port 300 for receiving a lower section 1a' of the leg portion 1a, the receiving port 300 being open toward an obliquely upper direction, a latch 302 formed into a substantially inverted J-shape as viewed from the side, the latch 302 having a lower base portion 302a and a curved upper portion 302b, a pivot pin 303 for causing the latch 302 to be pivotally supported to a side portion of the pedestal 302, the latch 302 being pivotally supported at the lower base portion 302a to the side portion of the pedestal 301 by the pivot pin 303 with the curved upper portion 302b facing the receiving port 300 of the pedestal 301, and a torsion coil spring 304 mounted on the pivot pin 303. The torsion coil spring 304 has a coiled spring portion 304a, a first spring end 304b and a second spring end 304c. The coiled spring portion 304a of the torsion coil spring 304 is mounted on an axis of the pivot pin 303. The first spring end 304b is fastened to the side portion of the pedestal 301 at a position close to a rear side of the pivot pin 303. The second spring end 304c is fastened to a side portion of the latch 302 which is above the pivot pin 303. More particularly, the first spring end 304b of the torsion coil spring 304 is fastened to a stop rod 306 which protrudes from the pedestal 301. The second spring end 304c of the torsion coil spring 304 is fastened to a protrusion 302d which protrudes from the side portion of the latch 302.

The latch 302 is always biased rearward away from the back of the receiving port 300 of the pedestal 301 by the torsion coil spring 304. The latch 302 further has a jaw portion 302c protruding beyond an inner surface of the receiving port 300 from the lower base portion 302a. When the lower section 1a' of the leg portion 1a is received in the receiving port 300 of the pedestal 301, the lower section 1a' of the leg portion 1a is brought into contact with the jaw portion 302c of the latch 302 to kick the jaw portion 302c against the action of the torsion coil spring 304. The jaw portion 302c is provided as a continuation of the curved upper portion 302b, whereby a curved surface which serves as a part of a hook catching the lower section 1a' of the leg portion 1a is provided in the latch 302.

As shown in FIG. 3, the pedestal 301 is provided with a substantially U-shaped clip 305 constituting a part of the receiving port 300. An opening of the substantially U-shaped clip 305 has a width slightly narrower than a diameter of an axis of the lower section 1a' of the leg portion 1a. Each of both end portions of the opening of the U-shaped clip 305 is curved outwardly. The clip 305 has retainer hooks 305a, 305b. The pedestal 301 seated on the lower step portion of the vehicle body floor as discussed above has slits 301a, 301b for receiving the retainer hooks 305a, 305b of the clip 305. The clip 305 is secured to the pedestal 301 by causing the retainer hooks 305a, 305b of the clip 305 to be engaged with and fixed in the slits 301a, 301b of the pedestal 301.

Figure 4:
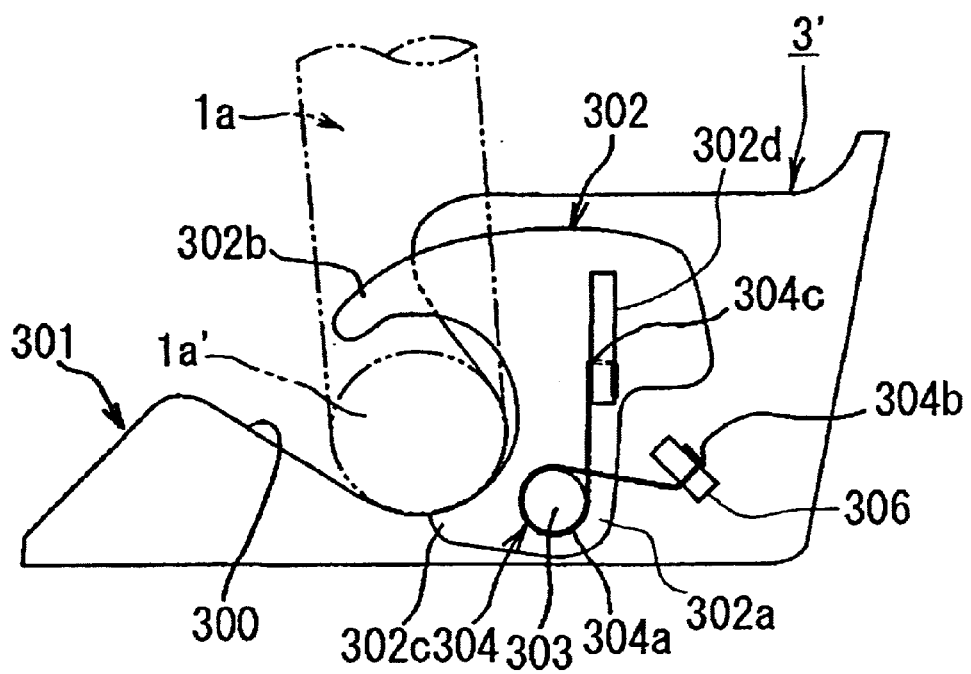
FIG. 4 is a schematic view showing the inertia locking system, in which the clip is removed for clarity of illustration, and being of assistance in explaining an initial operation state of the inertia locking system.

In the collapsible seat provided with the inertia locking system 3' constructed as described above, when the seat cushion 1 is rotated around the supporting shaft 1c in order that the seat cushion 1 is engaged with the inertia locking system 3' through the lower section 1a' of the leg portion 1a, the lower section 1a' of the leg portion 1a is at first received in the receiving port 300 and brought into contact with the curved surface of the jaw portion 302c to kick the jaw portion 302c because the jaw portion 302c protrudes beyond the inner surface of the receiving port 300 from the base portion 302a of the latch 302 as shown in FIG. 2. When the jaw portion 302c of the latch 302 is kicked by the lower section 1a' of the leg portion 1a, as shown in FIG. 4, the latch 302 is operated so as to immediately cause the position of center of gravity corresponding to the fastening point of the second spring end 304c to be moved forward due to an inertia force which is applied to the latch 302 against the action of the torsion coil spring 304 due to the kicking of the jaw portion 302c by the lower section 1a' of the leg portion 1a.

Figure 5:
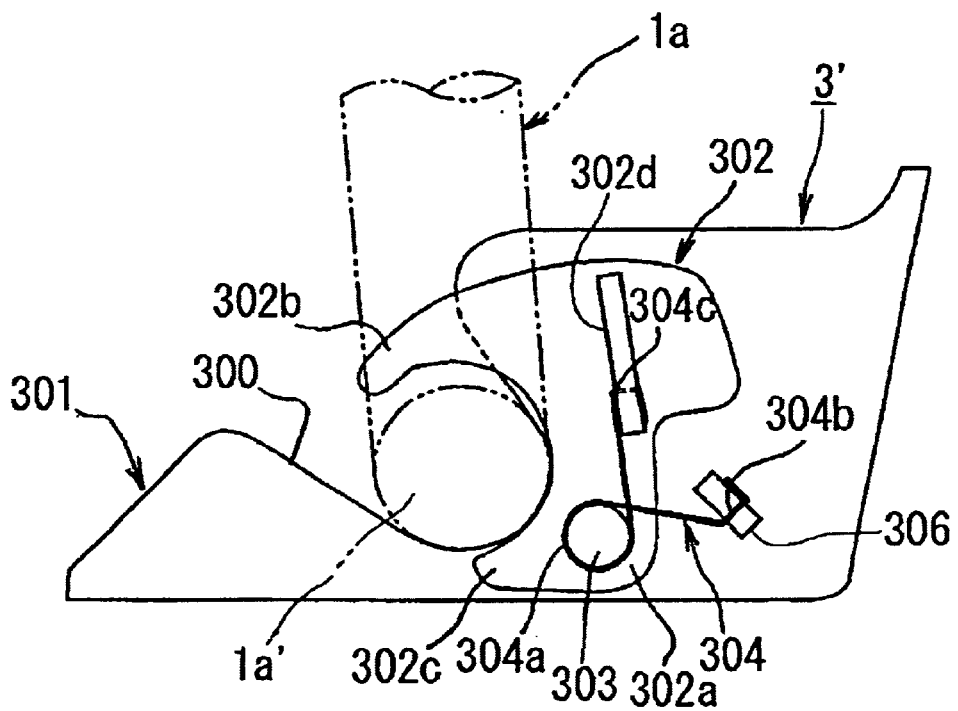
FIG. 5 is a schematic view showing the inertial locking system, in which the clip is removed for clarity of illustration, and being of assistance in explaining a lock operation state of the seat.

By such an operation of the latch 302, the lower section 1a' of the leg portion 1a is received in an innermost of the receiving port 300 as shown in FIG. 5, and gripped or caught by the curved upper portion 302b of the latch 302. Thus, the seat can be securely locked relative to the vehicle body floor by the latch 302 holding the lower section 1a' of the leg portion 1a of the seat cushion and the action of the torsion coil spring 304. Therefore, even when car-collision accidentally occurs, it is possible to cause the seat cushion to be kept locked by the inertia locking system 3' in such a manner that the seat cushion does not jump up.

When the passenger lifts up the seat cushion in order to release the seat cushion from the inertia locking system 3', the lower section 1a' of the leg portion 1a is moved along the curved surface of the curved upper portion 302b, and the latch 302 is operated by the action of the torsion coil spring 304 in such a manner as to cause the position of center of gravity corresponding to the fastening point of the second spring end 304c to be moved rearward and the latch 302 is automatically returned to the initial position due to the action of the coil torsion spring 304 while releasing the lower section 1a' of the leg portion 1a therefrom. At a time when the passenger lifts up the seat cushion 1 in order to detach the lower section 1a' of the leg portion 1a from the inertia locking system 3', the latch 302 is automatically operated due to the action of the torsion coil spring 304 so as to release the lower section 1a' of the leg portion 1a therefrom. Therefore, there is no troublesome matter in releasing operation of the leg portion 1a from the inertia locking system 3'. Further, the lower section 1a' of the leg portion 1a is adapted to kick the jaw portion 302c of the latch 302 as discussed above, so that even if any foreign matters or the like adhere around the axis of the pivot pin 303, it is possible to avoid a situation where the latch 302 can not be rotated due to the foreign matters or the like.

Figure 6:
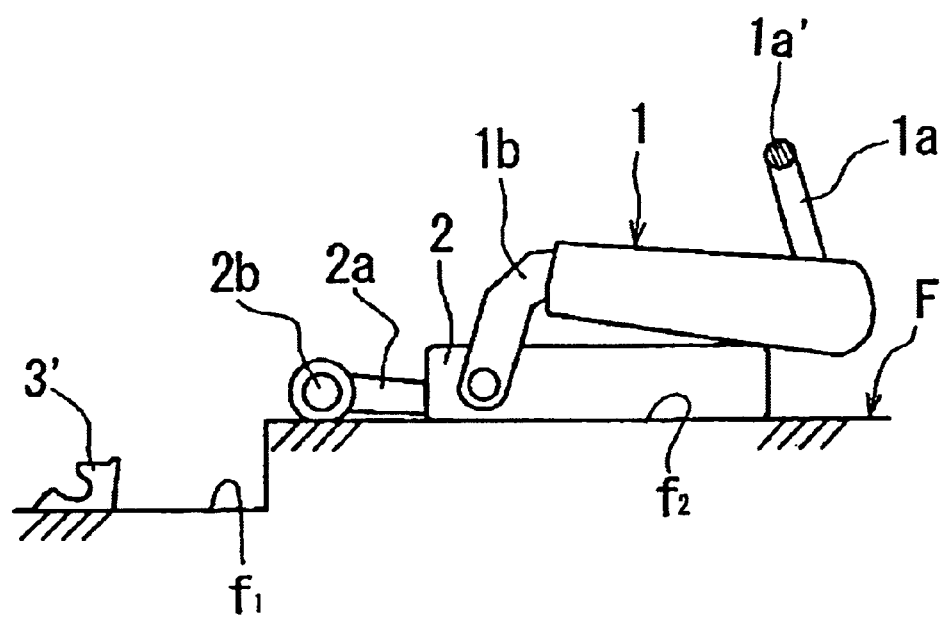
FIG. 6 is a schematic view showing the collapsible seat according to the present invention and being of assistance in explaining a state where the seat is collapsed.
Figure 7:
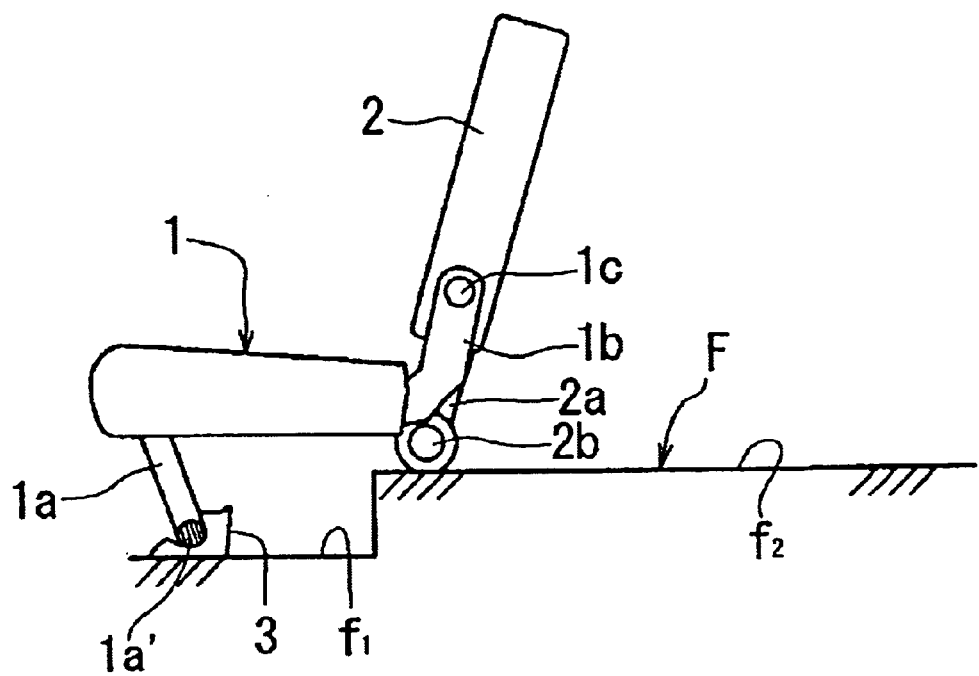
FIG. 7 is a schematic view showing a conventional collapsible seat.
Figure 8:
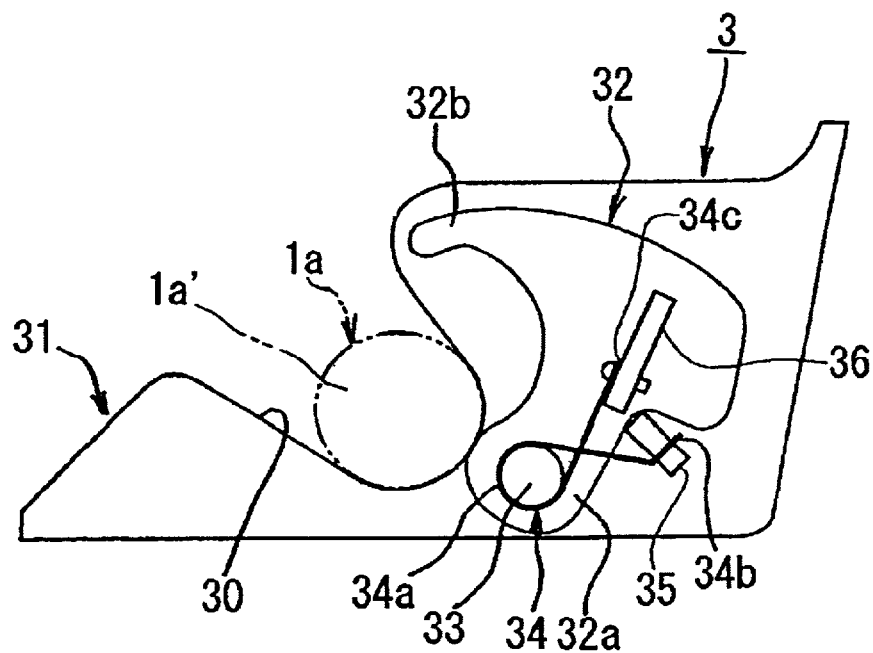
FIG. 8 is a schematic view schematically showing a conventional locking system.

Referring now to FIG. 6, the seat back 2 can be collapsed relative to the upper step portion $f_2$ of the vehicle body floor F so as to lie on the upper step portion $f_2$ of the vehicle body floor F, and the seat cushion 1 can be collapsed so as to lie on the seat back 2. Although a state where the leg portion 1a is collapsed is not illustrated in FIG. 6, the leg portion 1a can be collapsed so as to lie on an bottom of the seat cushion.

In this case, the description is given of the embodiment mentioned above in the case that the inertia locking system 3 is provided in the collapsible seat, however, the structure is not limited to this collapsible seat, and the inertia locking system 3 can be widely applied to a mechanism for gripping and holding various kinds of locked members.

In the above description, terms and expressions used in the present specification are only employed for simply describing, and do not limit the contents of the present invention. If there are used restrictive terms and expressions, they do not intend to exclude equivalent structures to the present embodiment mentioned above or a part thereof. Accordingly, various modifications can be added within the scope of the present claimed invention.

What is claimed is:

1. An inertia locking system adapted to be arranged on a body floor of a vehicle for locking a vehicle seat relative to said body floor, said vehicle seat including a seat back supported to said body floor and a seat cushion pivotally supported to said seat back, said seat cushion having a substantially C-shaped leg portion attached thereto with an opening thereof facing upwardly, said leg portion having a lower section;

said inertia locking system comprising:
   a pedestal adapted to be mounted on said body floor and having a substantially U-shaped receiving port;
   said receiving port having a first obliquely, upward facing opening for receiving said lower section of said leg portion;
   a substantially U-shaped clip having a second opening for receiving said lower section of said leg portion;
   said clip being received in said first opening of said receiving port and attached to said pedestal with said second opening thereof facing obliquely and upwardly;
   said second opening of said clip having a width slightly narrower than a diameter of an axis of said lower section of said leg portion;
   a latch formed into a substantially inverted J-shape;
   said latch having a lower base portion, a curved upper portion, and a jaw portion protruding from said lower base portion;
   said latch being pivotally supported at said lower base portion thereof to a side portion of said pedestal by a pivot pin with said upper portion thereof facing said receiving port and with said jaw portion protruding beyond an inner surface of said receiving port; and
   a torsion coil spring for always biasing said latch away rearward from said receiving port;
   said torsion coil spring having a coiled spring portion and first and second ends;
   said coiled spring portion being mounted on an axis of said pivot pin;
   said first end of said torsion coil spring being fastened to a position of said side portion of said pedestal which is close to a rear side of said pivot pin;
   said second end of said torsion coil spring being fastened to a side of said latch;
   wherein when said lower section of said leg portion is received in said first opening of said receiving port and said second opening of said clip, said lower section of said leg portion kicks said jaw portion so as to rotate said latch in the opposite direction to the direction in which said latch is always biased by said torsion spring, whereby said lower section of said leg portion is positively caught by said upper curved portion of said latch.

2. A collapsible seat for a vehicle comprising:
a seat back supported to a body floor of a vehicle;
a seat cushion pivotally supported to said seat back so as to be tiltable;
said seat back being provided with a substantially C-shaped leg portion;
said leg portion being attached to said seat cushion with an opening thereof facing upwardly;
said leg portion having a lower section; and
an inertia locking system for locking said seat relative to said body floor;

said inertia locking system comprising:
   a pedestal mounted on said body floor and having a substantially U-shaped receiving port;
   said receiving port having a first obliquely, upward facing opening for receiving said lower section of said leg portion;
   a substantially U-shaped clip having a second opening for receiving said lower section of said leg portion;
   said clip being received in said first opening of said receiving port and attached to said pedestal with said second opening thereof facing obliquely and upwardly;
   said second opening of said clip having a width slightly narrower than a diameter of an axis of said lower section of said leg portion;
   a latch formed into a substantially inverted J-shape;
   said latch having a lower base portion, a curved upper portion, and a jaw portion protruding from said lower base portion;
   said latch being pivotally supported at said lower base portion thereof to a side portion of said pedestal by a pivot pin with said upper portion thereof facing said receiving port and with said jaw portion protruding beyond an inner surface of said receiving port; and
   a torsion coil spring for always biasing said latch away rearward from said receiving port;
   said torsion coil spring having a coiled spring portion and first and second ends;
   said coiled spring portion being mounted on an axis of said pivot pin;
   said first end of said torsion coil spring being fastened to a position of said side portion of said pedestal which is close to a rear side of said pivot pin;
   said second end of said torsion coil spring being fastened to a side of said latch;
   wherein when said lower section of said leg portion is received in said first opening of said receiving port and said second opening of said clip, said lower section of said leg portion kicks said jaw portion so as to rotate said latch in the opposite direction to the direction in which said latch is always biased by said torsion spring, whereby said lower section of said leg portion is positively caught by said upper curved portion of said latch.

* * * * *